Patented Nov. 6, 1934

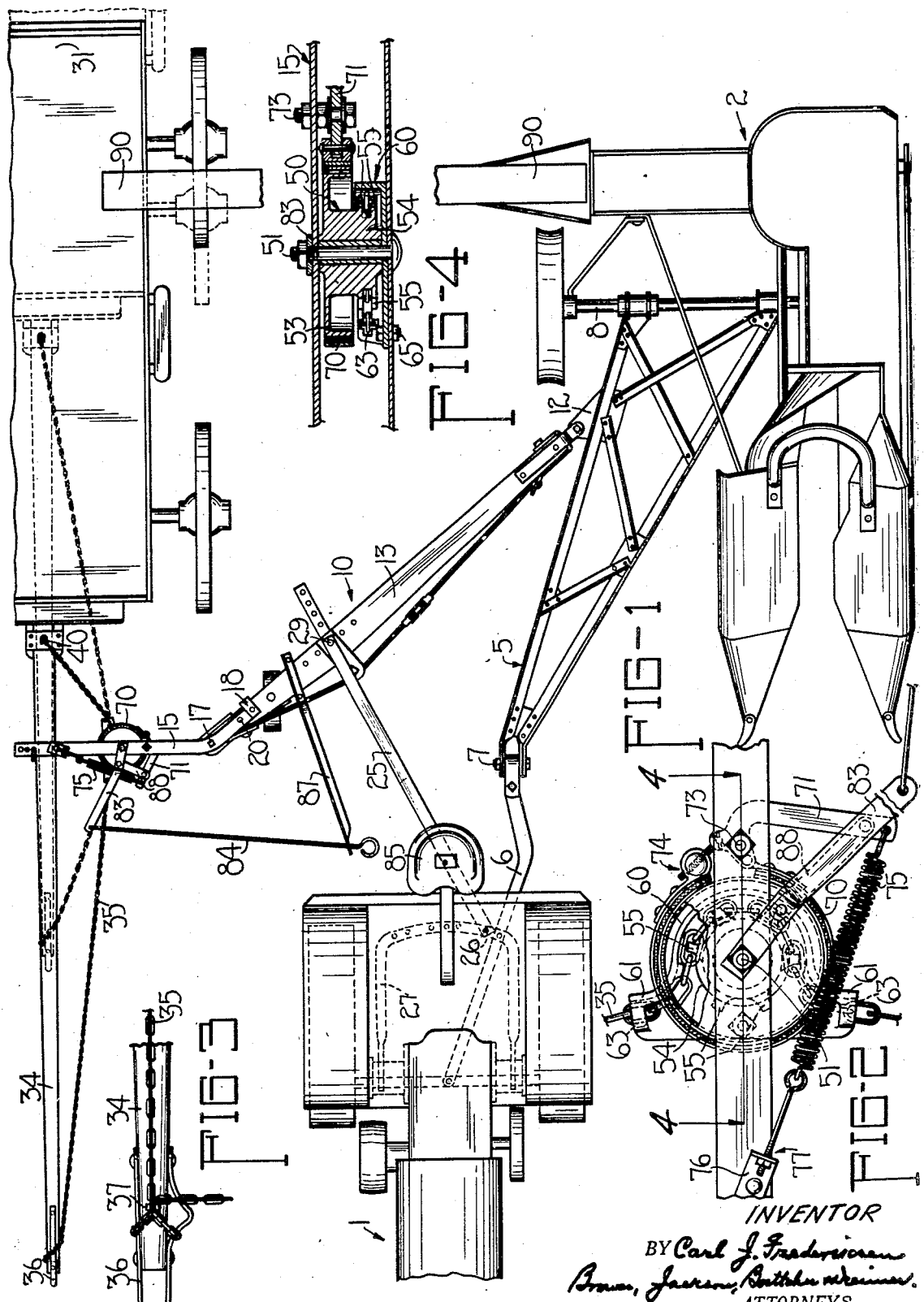

1,980,046

UNITED STATES PATENT OFFICE

1,980,046

WAGON HITCH

Carl J. Frederiksen, Moline, Ill., assignor to Deere & Company, Moline, Ill., a corporation of Illinois Application December 10, 1931, Serial No. 580,107

24 Claims. (Cl. 280—33.44)

The present invention relates to draft connections and more particularly to connections of the adjustable type for hitching an agricultural implement and a wagon to a tractor.

It is old to provide draft connections of this type which comprise a diagonally or generally laterally disposed beam structure connected between the implement and the wagon, and it is also old in such a draft connection to provide for adjusting the position of the wagon with respect to the implement. Generally this is a desirable feature where the implement is a corn harvester or the like having a discharge elevator or conveyor discharging the ears of corn into the wagon. During the process of harvesting the corn crop it is, of course, necessary to shift the wagon with respect to the conveyor so as to fill up the bed of the wagon evenly from front to rear.

The principal object of the present invention is the provision of such a draft connection as above referred to in which means is provided for adjusting the position of the wagon relative to the implement without stopping the forward movement of the machine. Another object of the present invention is to provide such an adjusting means which is effective in positively holding the wagon from movement, either forwardly or rearwardly, with respect to the implement when such movement is not desired.

Another object of the present invention is to provide such adjusting means in connection with extensible means providing for the easy attachment of draft animals or other draft means to the wagon so that when the latter is filled it is an easy matter to move the same away from the tractor and implement and bring an empty wagon to take the place of the one just filled.

Another object of the present invention is to provide in such a draft connection a friction brake controlled means operating in connection with a flexible draft transmitting element associated with the wagon, so that by the operation of the brake and by moving the tractor forwardly or rearwardly the position of the wagon with respect to the implement can be adjusted without the operator leaving his station on the tractor. Preferably, also, the means just referred to is so arranged that the wagon is positively held against movement in both directions when the brake means is engaged.

Other objects and advantages of the present invention will be apparent to those skilled in the art after a consideration of the following detailed instruction of a preferred structural embodiment, illustrated in the accompanying drawing in which:

Figure 1 is a plan view showing a tractor, an implement, and a wagon disclosed at one side thereof, all connected together by my improved draft connection;

Figure 2 is an enlarged plan view showing details of the friction brake controlled means and the flexible draft transmitting element or chain operatively associated therewith, the brake means being illustrated in this figure as released while in Figure 1 the brake means is shown as locked in which the position of the wagon is fixed with respect to the implement;

Figure 3 illustrates one way of connecting the forward end of the flexible draft transmitting element or chain with the forward end of the draft tongue of the wagon; and Figure 4 is an enlarged cross sectional view taken through the brake mechanism and corresponding to a section along the line 4—4 of Figure 2.

Referring now more particularly to Figure 1, I have disclosed a tractor 1, an implement 2, and a wagon or other vehicle 3 as operatively connected together by means of draft connections similar to that shown in the copending application Serial No. 376,561, filed July 8, 1929, by Wilbur J. Coultas and myself. Reference may be had to that application for specific details of the draft connection so that for the present purpose it suffices to note that the reference numeral 5 indicates a draft member extending forwardly from the implement 2 and is connected to the laterally swinging draw bar 6 of the tractor by means including a pivot bolt 7. The draft member 5 is preferably formed of angle bars suitably braced together and connected with the supporting axle 8 of the implement 2 at their rear ends. The draft transmitting structure 10 extends in a generally laterally and forwardly direction and is connected between the implement 2 and the wagon 3. For this purpose the draft member 5 is provided with a gusset plate 12 with which the laterally and forwardly extending draft bar 13 is pivotally connected. The laterally outer end of the bar 13 carries a pivoted extension or guide member 15. This member preferably comprises a pair of vertically spaced bars pivoted to the end of the bar 13 by means of a pivot bolt 17 and provided with a stirrup 18 to limit the angular movement of the extension member 15 in a clockwise direction as viewed in Figure 1. Preferably, also, the guide member 15 is provided with suitable openings inwardly of the pivot 17 through which a pin 20 can be inserted which passes through a registering opening in the bar 13. Not only does this serve to prevent the counterclockwise movement of the extension 15 as viewed in Figure 1 but this construction also aids the stirrup 18 in preventing the clockwise movement of the extension member 15 and hence aids in transmitting the draft to the wagon 3.

Intermediate the ends of the bar 13 the draft structure 10 is directly connected with the tractor by means of a draft link 25 the forward end of which is connected, as at 26, with the U-shaped draw bar 27 of the tractor at a point spaced laterally with respect to the point of connection of the draft member 5 and the associated draft bar 6. The rear end of the generally rearwardly extending draft transmitting link 25 is pivotally connected with the intermediate portion of the bar 13, as indicated at 29 in Figure 1.

The wagon or vehicle 3 is provided with a forwardly extending draft tongue 34 and associated with the tongue 34 is a flexible draft transmitting element in the form of a chain 35. The ends of the chain 35 may be connected with the wagon 3 at any point desired, but preferably the forward end of the chain 35 is looped around the forward end of the pole cap 36 and secured by any means desired, such as a bolt 37. The rear end of the chain 35 is preferably hooked around the king bolt 40. It will be observed that the points of connection of the chain with the wagon are spaced fore and aft of the extension 15 and the laterally outer end of the draft structure 10.

Draft is transmitted from the draft structure 10 to the chain 35 through a friction brake controlled mechanism mounted on the laterally outer end of the draft structure 10, preferably on the pivoted extension or guide member 15. This mechanism comprises a rotatable member 50 journaled on the extension member 15 by means of a pivot bolt 51, as best shown in Figure 4. This rotatable member includes an upper friction brake drum 53 and a lower toothed portion 54 formed integrally. The toothed portion 54 is provided with two rows of teeth 55. The teeth 55 engage between alternate links of the chain 35 which is trained around the member 50 as best shown in Figure 2. The chain 35 is held in interlocking engagement with the teeth on the member 54 by means of a guide member 60 which is curved about the rotatable member 50 and embraces a portion of the section 54 whereby to hold the portion of the chain 35 which is looped about the rotatable member 50 in position. The guide member 60 is also provided with outwardly flared ends 61 which are provided with guide openings 63. These openings are cross shaped to properly guide the chain into interlocking engagement with the rotatable member 50 and to position the individual links so that the teeth 55 will properly engage therewith. The guide member 60 is fixed to the lower one of the bars forming the pivoted extension 15, as best shown in Figure 4, by means of a bolt 65 and the pivot bolt 51.

Suitable means for controlling the rotation of the rotatable member 50, and hence controlling the fore and aft movement of the draft element 35 and the wagon 3, is provided. Preferably, this means takes the form of a friction brake means. Reference was made above to the brake drum 53, and operatively associated with the brake drum is a brake band or shoe 70 the ends of which are connected to the arms of a bell crank or lever 71 pivotally supported from the upper one of the bars constituting the extension member 15, as by means of a bolt 73. A suitable adjustment means 74 is provided by which the brake band 70 may be adjusted. The braking member 70 may be either internal expanding or external contracting, but preferably it is the latter, as illustrated.

As will be apparent, when the brake 70 is engaged with the brake drum 53 to prevent rotation of the rotatable member 50 the chain 35 and the wagon 3 will be prevented from moving with respect to the laterally outer end of the draft transmitting structure 10 in either direction. Thus, draft transmitted to the structure 10 will be effective to move the wagon 3 either forwardly or rearwardly, and, further, the wagon 3 will be prevented from overrunning the draft structure 10 when the brake 70 is engaged and the pin 20 inserted, as illustrated in Figure 1. The brake 70 is normally held in locked engagement with the drum 53 by means of a tension spring 75 connected at one end with the actuating member or lever 71 and at its other end with a slip 76 secured to the extension member 15. This spring may be adjusted by a threaded eye bolt construction 77.

The mechanism for releasing the brake includes an operating lever 83 which is pivoted on the bolt 51 and is controlled through a link or rod 84 which extends to within reach of the operator positioned on the operator's station 85 of the tractor. A support 87 serves to hold the inner end of the operating link 84 in a position to be accessible to the operator. A link 88 is pivotally connected with the actuating lever 71 and with the inner end of the operating lever 83, as best shown in Figures 1 and 2. Figure 1 illustrates the position of these parts when the brake is applied to lock the rotatable member 50 and prevent its rotation. Figure 2 illustrates these parts after a pull has been exerted on the link 84 to swing the operating lever 83 in a counterclockwise direction as viewed in Figure 1 whereby the brake 70 is released and the rotation of the member 50 permitted. From Figure 2 it will be observed that in this position the link 88 and the inner end of the lever 83 form a toggle connection by which the brake is maintained in inoperative position notwithstanding the presence of the spring 75. When it is desired to apply the brake to prevent the rotation of the member 50 all that it is necessary to do is to move the link 84 outwardly a small amount, thereby breaking the toggle and permitting the link 75 to apply the brake. One advantage of this particular construction is that there will be a small amount of initial slippage between the brake band 70 and the brake drum 53 during the time that the spring 75 is applying the brake.

The operation of the present invention will be obvious from the above description. Figure 1 illustrates the relation of the parts, including the tractor 1, the implement 2 and the wagon 3, when the wagon 3 is empty and the machine is first placed in operation. In this position it will be noted that the conveyor or elevator 90 reaching from the implement 2 to the wagon 3 is disposed so as to discharge into the rear portion of the wagon. This arrangement is secured by initially positioning the wagon 3 in a forward position with respect to the implement 2. When the rear portion of the wagon 3 has been filled, it being understood that the brake 70 has been engaged so as to transmit draft to the wagon 3 during the period of filling this portion, the operator pulls the rod 84 inwardly which unlocks the brake and permits the wagon to lag backwardly during the continued forward movement of the tractor 1 and the implement 2. When the wagon has reached the desired position with respect to the elevator or conveyor 90, the operator releases the rod 84, thus applying the brake to the rotatable member 50 and again transmitting the forward draft to the wagon 3. This operation is repeated until the entire wagon has been filled evenly from front to rear.

At this time it is then desirable to remove the filled wagon 3 from the machine, and this can be easily accomplished by removing the pin 20 and swinging the extension member 15 inwardly toward the tractor after detaching the forward and rear ends of the chain 35. After this has been done it is comparatively easy to attach draft animals to the wagon in the usual manner, since the extension member 15 is entirely out of the way. The wagon 3 is then driven away and an empty wagon replaced and connected with the machine in the same manner.

While I have shown and described in detail the preferred structural embodiment, it will be apparent to those skilled in the art that my invention is not to be limited to the particular means shown and described, but that, in fact, widely different means may be employed in the practice of the broader aspects of my invention, as defined by the appended claims.

What I claim, therefore, and desire to secure by Letters Patent is:

1. In a draft connection between a tractor and an agricultural implement and a wagon disposed to one side thereof, a draft member connecting the tractor and implement, a structure connecting said member and the wagon, means for transmitting draft to said structure, a flexible draft element connected with the wagon, means carried by said structure for adjustably fixing the flexible element with respect thereto for varying the effective length of the flexible element, and means for controlling said last named means and extending transversely to a point adjacent the operator's position on the tractor.

2. In a draft connection between a tractor and an agricultural implement and a wagon disposed to one side thereof, a draft member connecting the tractor and implement, a structure connecting said member and the wagon, means connecting the structure with the tractor, a flexible draft element connected with the wagon, and means carried at the laterally outer end of said structure for adjusting the flexible element with respect to said structure for varying the effective length thereof.

3. A draft connection between a tractor and an agricultural implement and a vehicle disposed at one side thereof, comprising means connecting the tractor with the implement to transmit draft thereto, a generally laterally extending structure connecting the implement with said vehicle, means for transmitting draft to said structure, a flexible draft element connected with the vehicle, and means for adjustably fixing the position of said vehicle relative to said structure including a rotatable member mounted for rotation on said structure and around which said flexible element is adapted to be trained in draft transmitting relation.

4. A draft connection between a tractor and an agricultural implement and a vehicle disposed at one side thereof, comprising means connecting the tractor with the implement, a generally laterally and forwardly extending structure connecting said implement with the vehicle, draft transmitting means connecting the tractor and said structure, a draft transmitting element connected with the vehicle, a movable extension carried by said structure, and means adjustably connecting said extension with said element so as to transmit draft thereto.

5. A draft connection between a tractor and an agricultural implement and a vehicle disposed at one side thereof and provided with a draft tongue, said connection comprising means connecting the tractor with the implement, a generally laterally extending structure connecting said implement with the vehicle, means for transmitting draft to said laterally extending structure, a flexible draft transmitting element connected with said vehicle, a movable extension carried at the laterally outer end of said structure and adapted to engage said draft tongue, and means for transmitting draft from said extension to said flexible draft element including a rotatable drum mounted on said movable extension and means associated therewith for fixing the position of said drum.

6. A draft connection between a tractor and an agricultural implement and a wagon disposed at one side thereof, comprising means connecting the tractor with the implement, a generally laterally extending structure connecting said implement with the wagon, a draft link directly connecting the tractor and the laterally extending structure, a draft transmitting element connected with said wagon and extending longitudinally thereof, and releasable friction means fixing the intermediate portion of said draft transmitting element with respect to the laterally outer end of said structure.

7. A draft connection between a tractor and an agricultural implement and a wagon disposed at one side thereof, comprising means connecting the tractor with the implement, a generally laterally extending structure reacting against said implement and connecting the same with the wagon, a draft link directly connecting the tractor and the laterally extending structure, a flexible draft transmitting element connected at both ends with said wagon at points spaced fore and aft, respectively, of said structure, and means adjustably connecting the intermediate portion of said flexible draft transmitting element with the laterally outer end of said structure to impose the draft of the wagon thereon.

8. In a draft connection between a tractor and an agricultural implement and a wagon disposed to one side thereof, draft means connecting the tractor and the implement, a draft transmitting structure connecting the implement and wagon, draft means transmitting draft from the tractor to said structure, a flexible draft transmitting element connected at fore and aft spaced points with said wagon, a rotatable member around which the intermediate portion of said flexible element is trained in draft transmitting relation, means mounting said rotatable element on the outer end of said structure, and brake means associated with said rotatable element for determining the position of said wagon relative to said implement.

9. In a draft connection between a tractor and an agricultural implement and a wagon disposed to one side thereof, a draft member connecting the tractor and the implement, a generally laterally extending structure connecting said member and the wagon, draft means connecting said structure with the tractor, a draft transmitting element extending longitudinally of the wagon and operatively associated therewith for transmitting draft thereto in both fore and aft directions, brake means mounted on the laterally outer end of said laterally extending structure and operatively associated with said draft transmitting element for transmitting draft thereto, in both directions, and means for controlling said brake means extending forwardly with respect to said structure whereby the brake means may be controlled from the tractor.

10. In a draft connection between a tractor and an agricultural implement and a wagon disposed to one side thereof, draft means connecting the implement with the tractor, a generally laterally extending structure connected at one end with said implement and at its intermediate end with said tractor, a flexible draft transmitting element connected at spaced fore and aft points with said wagon, a rotatable member journaled at the outer end of said structure and around which said element is trained in draft transmitting relation, and brake means for controlling the rotation of said member and in the relative position of said wagon and implement, said brake means comprising a rotatable drum, a brake band associated therewith, a lever for controlling said brake band and extending forwardly with respect to said structure, and an operating link for said lever extending towards the tractor so as to be operated therefrom.

11. In a draft connection between a tractor and an agricultural implement and a wagon disposed to one side thereof, a draft member connecting the tractor and the implement, a structure connecting said implement and the wagon and including a generally laterally extending bar having at its laterally outer end a pivoted extension, draft transmitting means connecting said structure and the tractor, a longitudinally extending flexible draft transmitting element connected at its ends with said wagon, a rotatable member journaled on said pivoted extension and around which said flexible element is trained in draft transmitting relation, brake means for controlling the rotation of said rotatable member to control the position of said wagon relative to said implement, and means for controlling said brake means comprising a lever pivoted to said extension.

12. In a draft connection between a tractor and an agricultural implement and a wagon disposed to one side thereof, a generally laterally extending draft transmitting structure connected with the implement and with said tractor, the laterally extending end of said structure being disposed adjacent said wagon, a longitudinally extending chain having both ends connected with said wagon, a rotatable member journaled at the outer end of said structure and formed to provide draft transmitting interengaging means cooperating with the chain to transmit draft from said structure to said wagon, and brake means connected with said rotatable member and controlled from the tractor to determine the relative position of the wagon with respect to said implement.

13. In a draft connection between a tractor and an agricultural implement and a wagon disposed to one side thereof, a generally laterally extending draft transmitting structure connected respectively with said implement and said tractor and having its laterally outer end disposed adjacent said wagon, a flexible draft transmitting element in the form of a chain having its ends connected with said wagon in fore and aft spaced relation, a rotatable member journaled at the laterally outer end of said structure and having its periphery formed to provide means engaging the chain in draft transmitting relation, said chain partially encircling said rotatable member, guide means maintaining said chain in draft transmitting relation with respect to said rotatable member, and means for controlling the rotation of said member whereby the position of said wagon with respect to said implement can be controlled.

14. In a draft connection between a tractor and an agricultural implement and a wagon disposed to one side thereof, draft transmitting structure between said tractor and implement and including a generally laterally extending member disposed adjacent said wagon, and draft transmitting means between said member and the wagon comprising a flexible element, a rotatable member around which said flexible element is trained, brake means for controlling the rotation of said rotatable member, and means for controlling the operation of said brake means including biased means for operating the same and a toggle mechanism operative to oppose said bias.

15. In a draft connection between a tractor and an agricultural implement and a wagon disposed to one side thereof, draft means between the tractor and said implement, a generally laterally extending structure connected with said implement and arranged in draft transmitting relation with respect to said tractor, the laterally outer end of said structure being disposed adjacent said wagon, a rotatable member journaled on said structure, a flexible draft transmitting element connected with said wagon at points spaced fore and aft of said structure, brake means including a movable braking member controlling the rotation of said rotatable member, said flexible element being trained around said rotatable member in draft transmitting relation, and means for controlling said brake means comprising a lever pivotally connected with said structure and operable to move said braking member into and out of cooperation with said rotatable member, spring means biased to move said lever to braking position, and means including a pair of toggle connected links, one pivoted to said structure and the other to said lever, for moving the latter out of braking position and holding the same in that position.

16. In a draft connection between a tractor and an agricultural implement and a wagon disposed to one side thereof, draft means connecting the tractor and the implement, a generally laterally extending structure connected at one end with the implement and disposed adjacent the wagon at its other end, draft means connecting said structure with the tractor, a flexible draft transmitting chain connected with the wagon at fore and aft spaced points, a rotatable member journaled on said structure and formed with means interengaging with the links of said chain in draft transmitting relation, guide means carried by said structure and operating to guide said chain at least partially around said rotatable member, brake means associated with said rotatable member and including a brake drum and a movable braking element associated therewith, means for operating said braking element comprising a lever pivoted to said structure and connected to move said braking element, a spring biased to apply the brake, means including a toggle mechanism for moving said lever to release the brake and hold the same in released position, an actuating rod connected with said toggle mechanism and extending to a point adjacent the tractor, and support means carried by said structure for maintaining said actuating rod in a position to be operated from the tractor.

17. In a draft connection between a tractor and an agricultural implement and a wagon disposed to one side thereof, a draft member connecting the tractor and the implement, a structure connected with said implement and extending in a generally lateral direction and having its lateral end disposed adjacent said wagon, link means directly connecting the tractor with the intermediate portion of said structure, a flexible member in the form of a chain having both ends connected with the wagon at points spaced fore and aft of the lateral end of said structure, a rotatable member mounted on said structure and having a peripheral portion formed to interengage with the links of said chain in draft transmitting relation, guide means for said chain and curved about said rotatable member and provided with portions formed to bring the links of the flexible element to the proper position to be engaged by said rotatable member, and means associated with the rotatable member for controlling the rotation thereof whereby to control the relative position of the wagon with respect to the implement.

18. In a draft connection between a tractor and an agricultural implement and a wagon disposed at one side thereof, a draft member connecting the tractor and implement, a structure connecting said member and the wagon, a link connecting the structure with the tractor, a draft member connected with the wagon to transmit draft thereto in both directions, and frictionally engaging means cooperating with said member and controlled by the operator on the tractor for optionally fixing the position of the wagon with respect to the implement, said frictionally engaging means being releasable to provide for changing the position of the wagon with respect to said implement.

19. In a draft connection between a tractor and an agricultural implement and a wagon disposed at one side thereof, a draft member connecting the tractor and implement, a structure connecting said member and the wagon, a draft transmitting link connecting the structure with the tractor, a draft member connected at both ends with the wagon to transmit draft thereto in both directions, and frictionally engaging means carried by said structure and cooperating with said draft member for connecting the latter with said structure, said frictionally engaging means being controlled by the operator on the tractor and adapted when engaged to restrain movement of the wagon with respect to said structure in both directions.

20. A draft connection between a tractor and an agricultural implement and a wagon disposed at one side thereof, comprising means connecting the tractor with the implement, a generally laterally extending structure connecting said implement with the wagon, means providing for the transmission of draft between the tractor and the laterally extending structure, a draft transmitting element connected with said wagon and extending longitudinally thereof, and releasable friction means fixing the intermediate portion of said draft transmitting element with respect to the laterally outer end of said structure.

21. In a draft connection between a tractor and an agricultural implement and a wagon disposed at one side thereof, a draft member connecting the tractor and implement, a structure connecting said member and the wagon, a draft member connected with the wagon to transmit draft thereto in both directions, and frictionally engaging means cooperating with said member and controlled by the operator on the tractor for optionally fixing the position of the wagon with respect to the implement, said frictionally engaging means being releasable to provide for changing the position of the wagon with respect to said implement.

22. A draft connection between a tractor and an agricultural implement and a wagon disposed at one side thereof, comprising means connecting the tractor with the implement, a generally laterally extending structure connecting said implement with the wagon, a draft transmitting element connected with said wagon and extending longitudinally thereof to transmit draft thereto in both directions, a spring controlled holding device carried by the outer end of said structure and engageable with said draft transmitting element at a plurality of points for transmitting draft directly from said structure to the wagon, a lever pivotally connected with the outer end of said structure and operative to release said holding device against the tension of the spring means controlling the latter, and means under the control of the operator for actuating said lever.

23. A draft connection between a tractor and an agricultural implement and a wagon disposed at one side thereof, comprising means connecting the tractor with the implement, a generally laterally extending structure connecting the wagon tongue and including a beam supported by the implement at its rear end and supporting the wagon tongue at its forward end, a draft transmitting member connected at its ends with the opposite ends of said tongue, a holding device carried near the forward end of said beam and engageable with said draft transmitting member at a plurality of points, means for controlling said holding device including a trip lever pivotally supported on the forward end of the beam, and means under the control of the operator for actuating said trip lever.

24. A draft connection between a tractor and an agricultural implement and a wagon disposed at one side thereof, comprising means connecting the tractor with the implement, a generally laterally extending structure connecting said implement with the wagon tongue and including a beam supported by the implement at its rear end and supporting the wagon tongue at its forward end, a draft transmitting member connected at its ends with the opposite ends of said tongue, a spring controlled holding device carried near the forward end of said beam and engageable with said draft transmitting member at a plurality of points for transmitting draft from said beam directly to said member, means for releasing said holding device against the tension of the spring, means controlling the holding device and including a trip lever pivotally supported on the forward end of the beam, and means under the control of the operator for actuating said trip lever.

CARL J. FREDERIKSEN.